US012600038B2

(12) United States Patent (10) Patent No.: US 12,600,038 B2
Sun et al. (45) Date of Patent: Apr. 14, 2026

(54) MOTION CONTROL METHOD AND ROBOT

(71) Applicant: BEIJING XIAOMI ROBOT TECHNOLOGY CO., LTD., Beijing (CN)

(72) Inventors: Guokang Sun, Beijing (CN); Sheng Cao, Beijing (CN); Quanbin Xin, Beijing (CN); Yinghao Gao, Beijing (CN); Zebang Zhang, Beijing (CN); Zeyu Ren, Beijing (CN); Chenguang Sun, Beijing (CN); Jiajun Zhang, Beijing (CN); Wenping Guo, Beijing (CN); Diyun Xiang, Beijing (CN)

(73) Assignee: BEIJING XIAOMI ROBOT TECHNOLOGY CO., LTD., Beijing (CN)

( * ) Notice: Subject to any disclaimer, the term of this patent is extended or adjusted under 35 U.S.C. 154(b) by 479 days.

(21) Appl. No.: 18/135,673

(22) Filed: Apr. 17, 2023

(65) Prior Publication Data

US 2024/0181638 A1 Jun. 6, 2024

(30) Foreign Application Priority Data

Dec. 5, 2022 (CN) .......................... 202211551982.4

(51) Int. Cl.
*B25J 9/16* (2006.01)
*B25J 11/00* (2006.01)
*B25J 13/00* (2006.01)

(52) U.S. Cl.
CPC ........... *B25J 9/1664* (2013.01); *B25J 9/1679* (2013.01); *B25J 11/004* (2013.01); *B25J 13/003* (2013.01)

(58) Field of Classification Search
CPC ...... B25J 11/004; B25J 13/003; B25J 9/1664; B25J 9/1679; G05B 22/40411
See application file for complete search history.

(56) References Cited

U.S. PATENT DOCUMENTS 11,426,877 B2 * 8/2022 Van Rooyen ........ G10H 1/0008
2019/0022860 A1 * 1/2019 Kishi ...................... G06T 13/40
(Continued)

FOREIGN PATENT DOCUMENTS

CN 111531562 A 8/2020
DE 102010045701 B3 1/2012
JP 2004330378 A 11/2004

OTHER PUBLICATIONS

The Extend European Search Report of Application No. 23170045. 1, dated on Oct. 13, 2023, (13p).

*Primary Examiner* — Wade Miles
*Assistant Examiner* — Zachary Joseph Wallace
(74) *Attorney, Agent, or Firm* — Arch & Lake LLP

(57) ABSTRACT

A motion control method applied to a robot and the robot are provided. The method includes: obtaining a music file to be performed, where the music file includes a plurality of playing times and at least one played musical instrument at each playing time; determining a head position at each playing time according to the at least one played musical instrument at each playing time; and controlling a playing part and a head of the robot to execute a playing action, according to the at least one played musical instrument and the head position at each playing time, to allow a corresponding played musical instrument to generate a sound and allow the head to be in a corresponding head position at each playing time.

18 Claims, 6 Drawing Sheets

(56) References Cited

U.S. PATENT DOCUMENTS

2020/0164519 A1* 5/2020 Lee ........................ B25J 9/1694
2021/0387346 A1* 12/2021 Gillett ................. B25J 19/0075

* cited by examiner

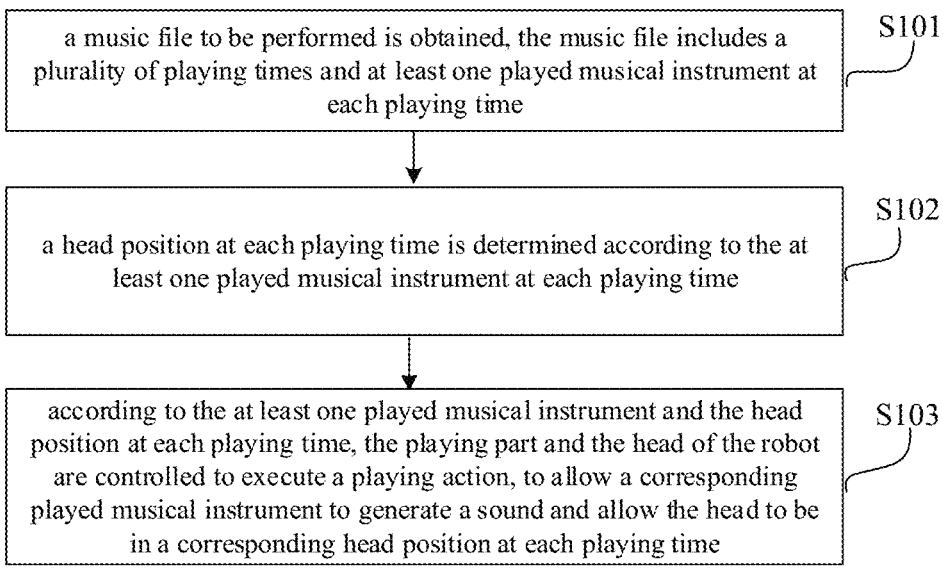

| a music file to be performed is obtained, the music file includes a plurality of playing times and at least one played musical instrument at each playing time | S101 |

| a head position at each playing time is determined according to the at least one played musical instrument at each playing time | S102 |

| according to the at least one played musical instrument and the head position at each playing time, the playing part and the head of the robot are controlled to execute a playing action, to allow a corresponding played musical instrument to generate a sound and allow the head to be in a corresponding head position at each playing time | S103 |

Fig. 1

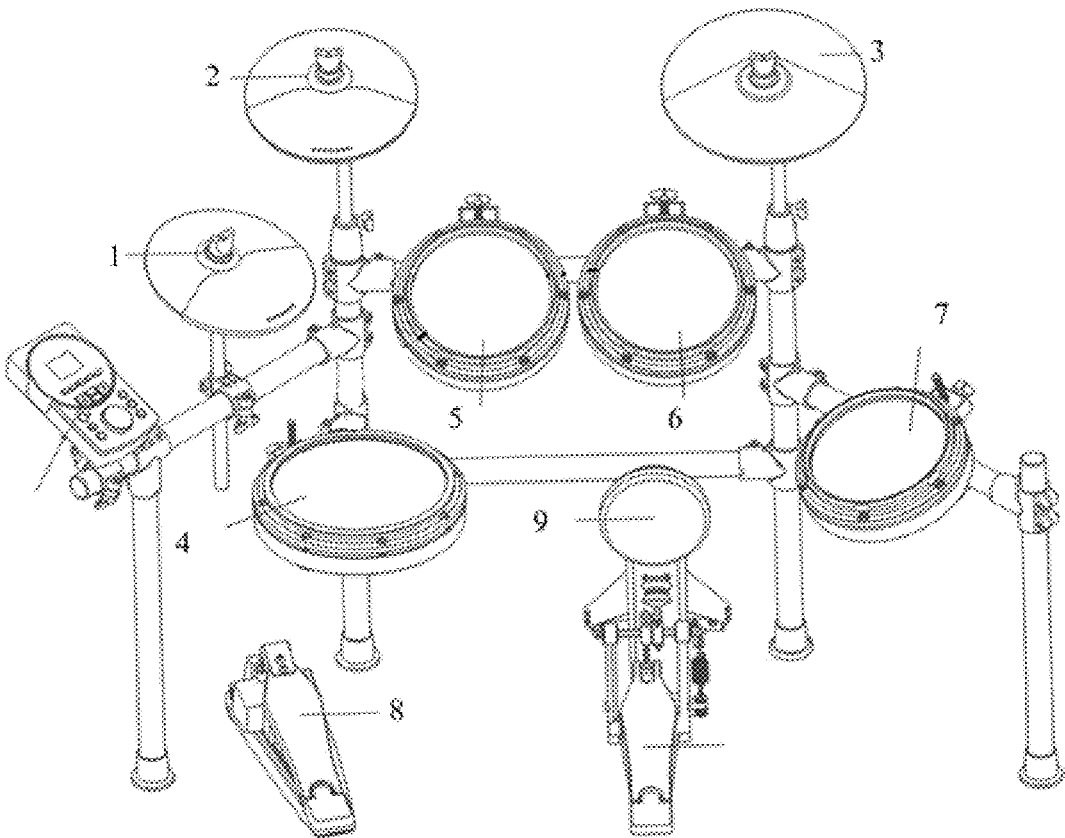

Fig. 2

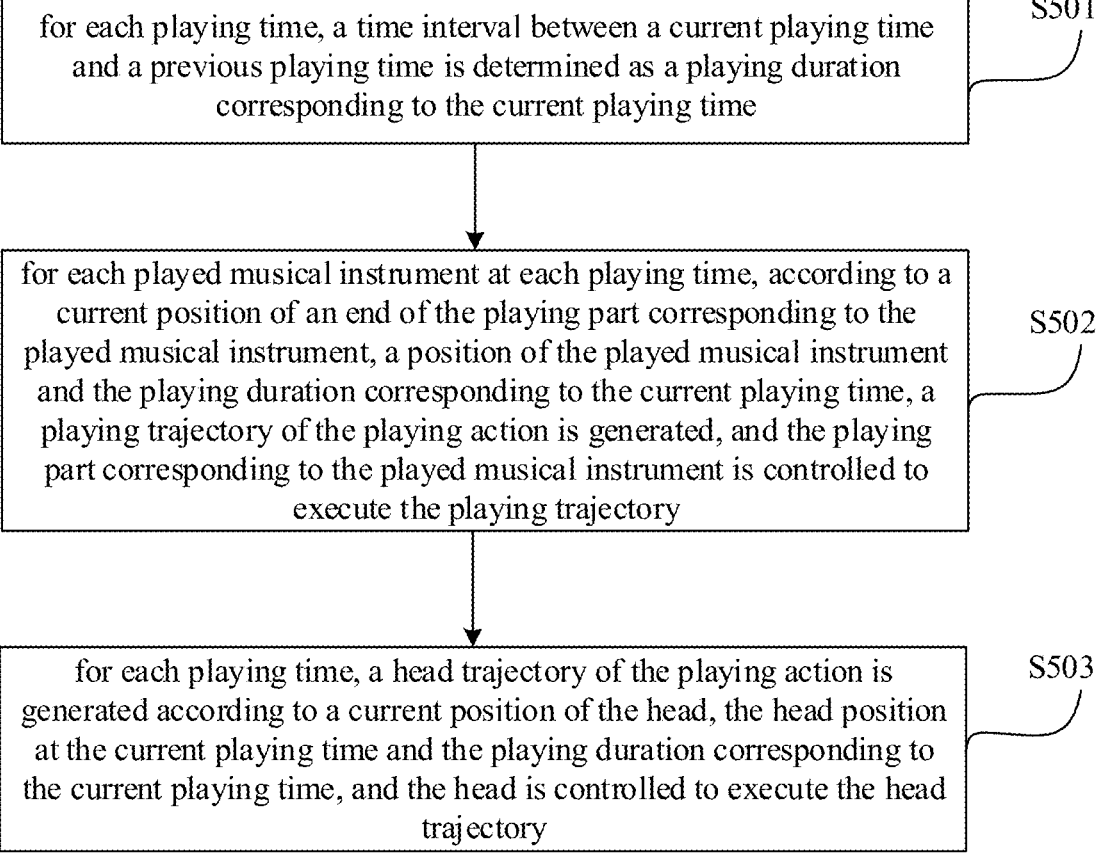

for each playing time, a time interval between a current playing time and a previous playing time is determined as a playing duration corresponding to the current playing time

S501 for each played musical instrument at each playing time, according to a current position of an end of the playing part corresponding to the played musical instrument, a position of the played musical instrument and the playing duration corresponding to the current playing time, a playing trajectory of the playing action is generated, and the playing part corresponding to the played musical instrument is controlled to execute the playing trajectory

S502 for each playing time, a head trajectory of the playing action is generated according to a current position of the head, the head position at the current playing time and the playing duration corresponding to the current playing time, and the head is controlled to execute the head trajectory

MOTION CONTROL METHOD AND ROBOT

CROSS-REFERENCE TO RELATED APPLICATION

This application is based on and claims priority to Chinese Patent Application No. 202211551982.4 filed on Dec. 5, 2022, the entire contents of which are incorporated herein by reference for all purposes.

BACKGROUND

In recent years, the robot technology has been developing continuously, becoming more and more intelligent and automatic, and the richness, stability and flexibility of actions have been improved to varying degrees. At present, robots can not only execute periodic and repetitive actions such as sweeping the floor and walking, but also play musical instruments, for example, the robots can play the drum set. However, in the related art, when the robots play the drum set, there are some problems of simple actions, low degree of personification and insufficient dynamic characteristics, i.e. the performance effect needs to be improved.

SUMMARY

The present disclosure relates to a field of robots, in particular to a motion control method and a robot.

According to a first aspect of the present disclosure, a motion control method is provided, which is applied to a robot, and includes: obtaining a music file to be performed, in which the music file includes a plurality of playing times and at least one played musical instrument at each playing time; determining a head position at each playing time according to the at least one played musical instrument at each playing time; and controlling a playing part and a head of the robot to execute a playing action, according to the at least one played musical instrument and the head position at each playing time, to allow a corresponding played musical instrument to generate a sound and allow the head to be in a corresponding head position at each playing time.

According to a second aspect of the present disclosure, a robot is provided, which includes a memory and a processor, in which the memory is configured for storing computer instructions capable of being run on the processor, and when executing the computer instructions, the processor is configured for: obtaining a music file to be performed, in which the music file includes a plurality of playing times and at least one played musical instrument at each playing time; determining a head position at each playing time according to the at least one played musical instrument at each playing time; and controlling a playing part and a head of the robot to execute a playing action, according to the at least one played musical instrument and the head position at each playing time, to allow a corresponding played musical instrument to generate a sound and allow the head to be in a corresponding head position at each playing time.

BRIEF DESCRIPTION OF DRAWINGS

The accompanying drawings, which are incorporated in and constitute a part of the specification, illustrate embodiments consistent with the present disclosure and together with the description, serve to explain the principles of the present disclosure.

FIG. 1 is a flow chart of a motion control method according to an embodiment of the present disclosure.

FIG. 2 is a schematic view of a drum set according to an embodiment of the present disclosure.

FIG. 5 is a flow chart of executing a playing action according to an embodiment of the present disclosure.

DETAILED DESCRIPTION

Figure 3:
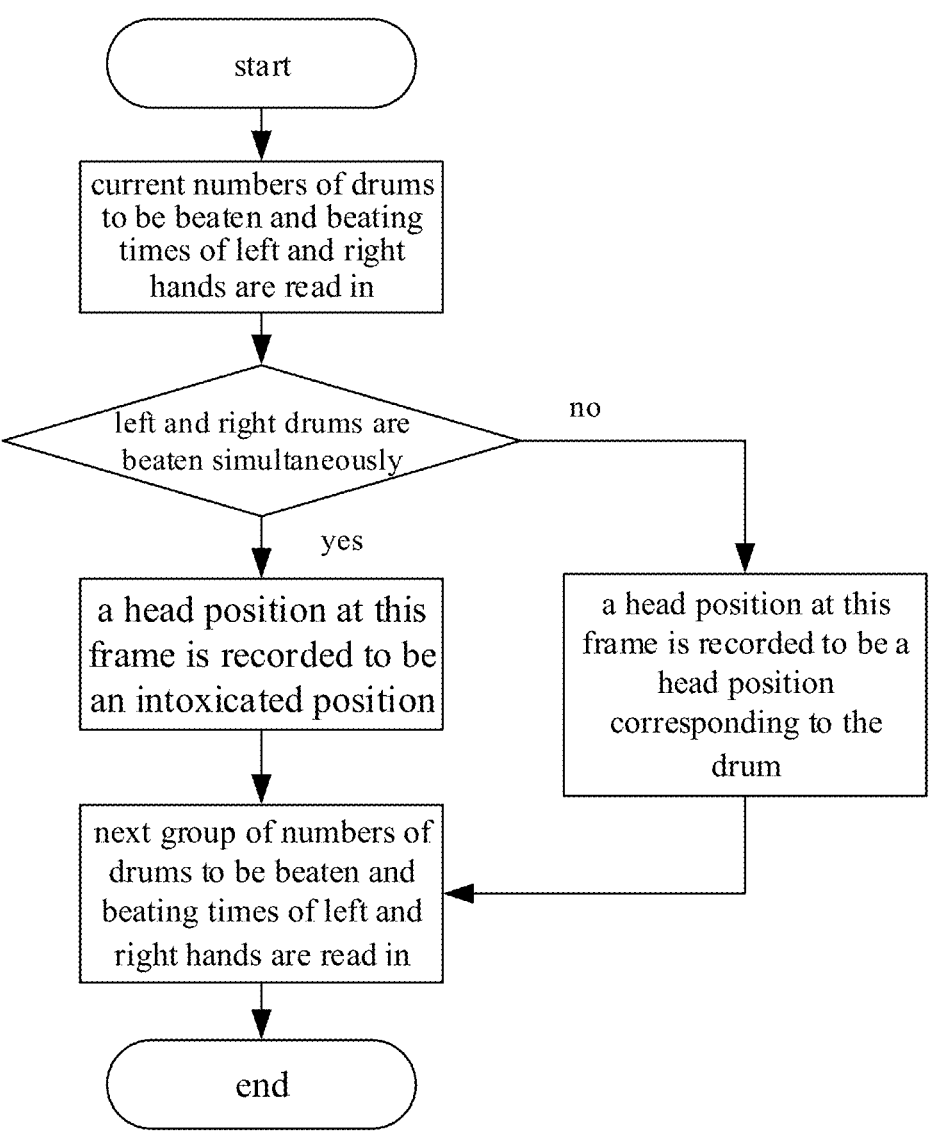
FIG. 3 is a flow chart for determining a head position according to an embodiment of the present disclosure.

Embodiments will be described in detail herein, examples of which are illustrated in the accompanying drawings. When the following description refers to the drawings, the same numerals in different drawings refer to the same or similar elements, unless otherwise specified. The implementations described in the following embodiments do not represent all the implementations consistent with the present disclosure. On the contrary, they are merely examples of apparatuses and methods consistent with some aspects of the present disclosure as recited in the appended claims.

The terms used in the present disclosure are for the purpose of describing particular embodiments only, and are not intended to limit the present disclosure. As used in the present disclosure and the appended claims, the singular forms "a," "said," and "the" are intended to include the plural forms as well, unless the context clearly dictates otherwise. It will also be understood that the term "and/or" as used herein refers to and includes any or all possible combinations of one or more associated listed items.

It should be understood that although the terms first, second, third, etc. may be used in the present disclosure to describe various pieces of information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein may be interpreted as "at the time of" or "when" or "in response to determining."

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In recent years, the robot technology has been developing continuously, becoming more and more intelligent and automatic, and the richness, stability and flexibility of actions have been improved to varying degrees. At present, robots can not only execute periodic and repetitive actions such as sweeping the floor and walking, but also play musical instruments, for example, the robots can play the drum set. However, in the related art, when the robots play the drum set, there are some problems of simple actions, low degree of personification and insufficient dynamic characteristics, i.e. the performance effect needs to be improved.

In the related art, the robots used to play the musical instruments are usually specialized robots, and the robots can only execute a single repetitive action to complete the performance of the musical instruments. This kind of robots have strong mechanization in the performance process, with the simple actions and low degree of personification. Moreover, this kind of robot cannot complete other actions, i.e. it can only be used to play the musical instruments in a preset scene, with a single function and poor universality. For example, in the related art, a plurality of (generally three or more) industrial mechanical arms are used to play the drum set, and each mechanical arm is in charge of two drums, which has the low degree of personification and can only perform the function of playing the drum set.

Based on this, in one aspect, at least one embodiment of the present disclosure provides a motion control method. As shown in FIG. 1, which shows a flow chart of the method, the method includes steps S101 to S103.

This method may be applied to a robot, such as a legged robot. The robot may have a trunk and limbs. In one embodiment, as shown in FIG. 2, this method may be applied to a scene where the robot plays a drum set. The drum set includes a plurality of drums, namely cymbals 1, 2, 3, 4, 5, 6, 7 and pedals 8, 9 in FIG. 2. The robot is a universal robot, instead of a specialized robot for playing the drum sets. A lower limb of the robot has 10 degrees of freedom, and an upper limb of the robot also has 10 degrees of freedom, which can complete many functions such as walking, jumping, picking and placing objects, dancing and so on.

At step S101, a music file to be performed is obtained, the music file includes a plurality of playing times and at least one played musical instrument at each playing time.

The music file may be a digital file, such as a Musical Instrumental Digital Interface (MIDI) file. The Musical Instrumental Digital Interface (MIDI) protocol is a real-time data communication protocol between electronic musical instruments, synthesizers and other music-related hardware, and the coding of this protocol may be expanded into a file format that can record music information, i.e. the MIDI file.

The playing time may be a moment when a sound of at least one musical instrument exists, i.e. at least one musical instrument needs to be played to generate a sound at the playing time. The plurality of playing times in the music file may form a time series, and the at least one played musical instrument at each playing time may serve as note information of the playing time. In addition, the music file may also include a playing part corresponding to each played musical instrument of the at least one played musical instrument at each playing time, which further notes which playing part each played musical instrument should be played by.

In the scene where the robot plays the drum set, the at least one musical instrument at each playing time may be a part of the plurality of drums of the drum set, and the playing part corresponding to each musical instrument may be one of the limbs of the robot. In this scene, the music file may be simply understood as a time series in which different drums are beaten. For example, at 1 s, drum 1 is beaten by a right hand, drum 4 is beaten by a left hand, drum 8 is beaten by a left foot and drum 9 is beaten by a right foot; at 1.1 s, drum 2 is beaten by the right hand and drum 3 is beaten by the left hand; at 1.35 s, drum 6 is beaten by the right hand, and so on.

At step S102, a head position at each playing time is determined according to the at least one played musical instrument at each playing time.

It can be understood that when a person performs, a head of the person will move accordingly to improve the performance effect. Therefore, in order to improve the degree of personification and the diversity of action, the humanoid robot can also generate an action sequence of the head according to the music file when performing, i.e. determining the head position at each playing time. The action of the humanoid robot may be defined as two situations: one is an intoxicated state, in which the robot head shakes up and down or left and right, and the other one is a following state, in which the robot head makes an action of following the playing part.

A movement range of the head may be symmetrical about an original position of the head, i.e. the movement range of the head may be divided into a part on a first side of the original position of the head and another part on a second side of the original position of the head. The original position of the head is an original assembling position of the head of the robot, and the first side and the second side are opposite sides. For example, the first side is a left side and the second side is a right side, or the first side is a front side and the second side is a rear side. For example, the head position may be represented by a joint angle related to the head (for example, a joint between the head and a neck or a joint between the neck and the trunk). When the head is in the original position of the head, the joint angle related to the head is zero. When the head is on the first side (for example, the left side, the front side, etc.) of the original position of the head, the joint angle related to the head is less than zero. When the head is on the second side (for example, the right side, the rear side, etc.) of the original position of the head, the joint angle related to the head is larger than zero.

Correspondingly, each played musical instrument is marked with a first orientation or a second orientation, i.e. the orientation of each played musical instrument is defined in advance. Further, the first orientation and the second orientation may be opposite orientation. For example, in the drum set shown in FIG. 2, cymbals 1, 2, drums 4, 5 and pedal 8 are marked with left, while cymbal 3, drums 6, 7 and pedal 9 are marked with right.

Based on the above description of the orientations, for example, in a case that the at least one played instrument at any playing time is marked with a different orientation (for example, the played musical instruments at this playing time (i.e. a current playing time) are drums 4 and 6 in FIG. 2), and that the head position at the previous playing time is on the first side of the original position of the head, the head position at this playing time is determined on the second side of the original position of the head. For example, any one of at least one preset position on the second side of the original position of the head may be determined (randomly) as the head position at this playing time. In this example, the robot is in the intoxicated state, the orientations of the robot head may be defined as left and right in advance, and an intoxicated position may be preset on the left and right sides, respectively, so that the intoxicated position on the left side may be set as the head position when the head position is to be determined on the left side, and the intoxicated position on the right side may be set as the head position when the head position is to be determined on the right side.

For example, in a case that the at least one played instrument at any playing time (i.e. each playing time) is marked with the same orientation (for example, the played musical instruments at this playing time are drums 4 and 5 in FIG. 2), the head position at this playing time is determined according to a position of the at least one played musical instrument. For example, when there is one played musical instrument at this playing time, a head position corresponding to the played musical instrument is determined as the head position at this playing time; when there are a plurality of played musical instruments at this playing time, a midpoint position of head positions corresponding to the plurality of played musical instruments is determined as the head position at this playing time. In this example, the robot is in the following state, in which the head position corresponding to each musical instrument may be set in advance.

As shown in FIG. 3, which takes the scene where the robot plays the drum set as an example, a flow chart of determining the head position at each playing time according to the played musical instrument at each playing time is shown.

After starting, the note information of the i-th playing time in the music file is read in, for example, at 3 s, drum 7 is beaten by the left hand, pedal 8 is beaten by the left foot, and pedal 9 is beaten by the right foot. Then, it is judged whether the left played musical instrument and the right played musical instrument are beaten simultaneously. If the left and right drums are beaten simultaneously, it is judged that this frame (for example, this playing time) is in the intoxicated state, and the head position at a previous frame (for example, a previous playing time) is read. If the head position at the previous frame is on the left side or in the middle, it is determined that the head position at this frame is the intoxicated position on the right side (for example, −0.3 rad), and if the head position at the previous frame is on the right side, it is determined that the head position at this frame is the intoxicated position on the left side (for example, 0.3 rad). If the left and right drums are not beaten simultaneously, it is judged that this frame is in the following state. If one drum is beaten at this frame, the head position at this frame is determined as the head position corresponding to the beaten drum. If two or more drums are beaten at this frame, the head position at this frame is determined as a midpoint of the head positions corresponding to the beaten drums (i.e. an average value of angles), in which the head position corresponding to each drum may be set in advance, for example, the head position corresponding to drum 3 is 0.5 rad. Finally, the note information of all the playing times in the music file is read in a similar manner, the head position at each frame is determined, and an action series of the head can be obtained, which includes the time and the head position at each frame.

At step S103, according to the at least one played musical instrument and the head position at each playing time, the playing part and the head of the robot are controlled to execute a playing action, to allow a corresponding played musical instrument to generate a sound and allow the head to be in a corresponding head position at each playing time.

Since the robot is not necessarily the specialized robot for playing the musical instrument, and the playing times in the music file are uneven, the robot to be used may not be suitable for this music file, i.e., playing the musical instrument directly according to the music file has a high requirement for the motion control of the robot, or even cannot be completed. Therefore, the music file may be adaptively preprocessed in a following way, so that the robot can adapt to the music file: in the at least one played musical instrument at any playing time in the music file, if any played musical instrument exceeds the movement range of the playing part corresponding to this played musical instrument, the playing part corresponding to this played musical instrument is updated to another playing part (whose movement range can cover this played musical instrument and which is idle). That is, the actions those cannot be performed by the humanoid robot in the music file are replaced. For example, in the scene where the robot plays the drum set, it is possible to check the drum that cannot be beaten by either hand of the humanoid robot in terms of positions due to the insufficient working space and to switch to another hand for this drum.

Figure 4:
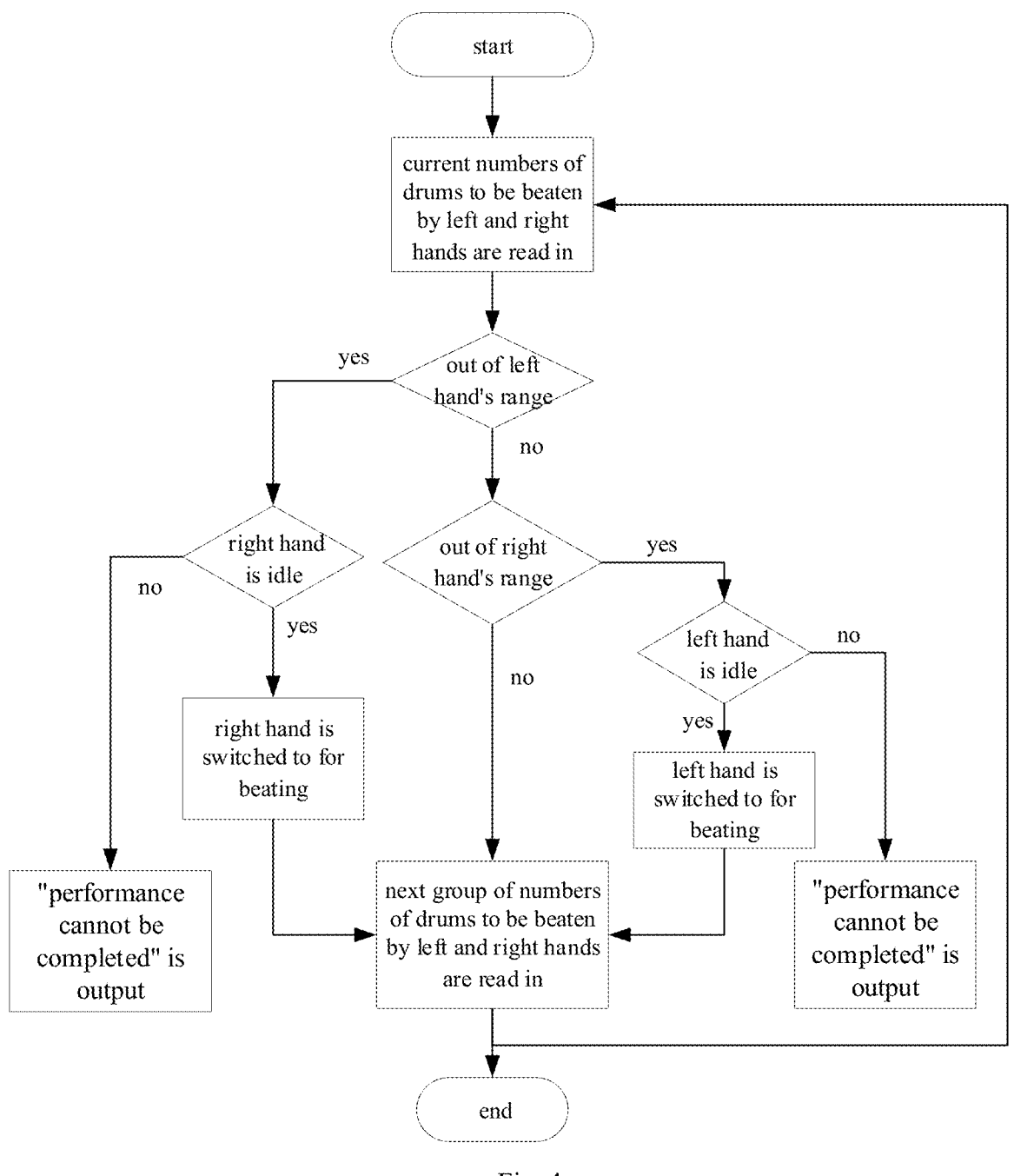
FIG. 4 is a flow chart of adaptively preprocessing a music file according to an embodiment of the present disclosure.

As shown in FIG. 4, which takes the scene where the robot plays the drum set as an example, a flow chart of adaptively preprocessing the music file is shown.

After starting, the note information of the i-th playing time in the music file is read in, for example, at 3 s, drum 7 is beaten by the left hand, pedal 8 is beaten by the left foot and pedal 9 is beaten by the right foot. Then, it is checked whether the drum to be beaten by the left hand can be reached by the left hand. If the left hand cannot beat the desired drum, i.e. the left hand cannot beat drum 7, it is judged whether the right hand is idle. If the right hand is idle, the right hand is enabled to beat drum 7, and the note information of the playing time is updated to that "at 3 s, drum 7 is beaten by the right hand, pedal 8 is beaten by the left foot, and pedal 9 is beaten by the right foot". If the right hand is not idle (i.e. the right hand has a beating task), it is determined that the robot cannot perform the music file. Finally, the note information of all the playing times in the music file is read in a similar manner.

Through the adaptive preprocessing of the music file, any music file is suitable for the robot to perform, thus improving the adaptability of this method to the music file and making it a universal method.

In one embodiment, the playing part and the head of the robot may be controlled to execute the playing action by a method as shown in FIG. 5, which includes steps S501 to S503.

At step S501, for each playing time, a time interval between a current playing time and a previous playing time is determined as a playing duration corresponding to the current playing time.

Taking the scene where the robot plays the drum set as an example, the key of the humanoid robot's performance process is to ensure the accurate beating of drumbeat and tempo, including that both hands, both feet and the head can keep the beat simultaneously, and that the movements are not stiff during the beating process. This step can convert a time stamp in the music file, so as to facilitate the subsequent control of playing actions, for example, a first music file may be converted into a second music file.

The first music file is as follows:

at 1 s, drum 1 is beaten by the right hand, drum 4 is beaten by the left hand, pedal 8 is beaten by the left foot, pedal 9 is beaten by the right foot, and the head turns to 0.3 rad;

at 1.1 s, drum 2 is beaten by the right hand and the head turns to −0.3 rad;

at 1.35 s, drum 6 is beaten by the right hand and the head turns to −0.5 rad;

at 1.7 s, drum 1 is beaten by the right hand, pedal 8 is beaten by the left foot, pedal 9 is beaten by the right foot, and the head turns to 0.3 rad;

at 1.9 s, drum 2 is beaten by the right hand and the head turns to −0.3 rad;

at 2.2 s, drum 6 is beaten by the right hand and the head turns to 0.3 rad;

at 2.3 s, drum 1 is beaten by the right hand, drum 4 is beaten by the left hand, pedal 8 is beaten by the left foot, pedal 9 is beaten by the right foot, and the head turns to −0.3 rad;

at 2.5 s, drum 2 is beaten by the right hand, drum 3 is beaten by the left hand, and the head turns to 0.3 rad;

at 2.75 s, drum 6 is beaten by the right hand and the head turns to −0.3 rad.

The second music file is as follows:

after 1 s, drum 1 is beaten by the right hand, drum 4 is beaten by the left hand, pedal 8 is beaten by the left foot, pedal 9 is beaten by the right foot, and the head turns to 0.3 rad;

after 0.1 s, drum 2 is beaten by the right hand and the head turns to −0.3 rad;

after 0.25 s, drum 6 is beaten by the right hand and the head turns to −0.5 rad;

after 0.35 s, drum 1 is beaten by the right hand, pedal 8 is beaten by the left foot, pedal 9 is beaten by the right foot, and the head turns to 0.3 rad;

after 0.2 s, drum 2 is beaten by the right hand and the head turns to −0.3 rad;

after 0.3 s, drum 6 is beaten by the right hand, and the head turns to 0.3 rad;

after 0.1 s, drum 1 is beaten by the right hand, drum 4 is beaten by the left hand, pedal 8 is beaten by the left foot, pedal 9 is beaten by the right foot, and the head turns to −0.3 rad;

after 0.2 s, drum 2 is beaten by the right hand, drum 3 is beaten by the left hand, and the head turns to 0.3 rad;

after 0.25 s, drum 6 is beaten by the right hand, and the head turns to −0.3 rad.

At step S502, for each played musical instrument at each playing time, according to a current position of an end of the playing part corresponding to the played musical instrument, a position of the played musical instrument and the playing duration corresponding to the current playing time, a playing trajectory of the playing action is generated, and the playing part corresponding to the played musical instrument is controlled to execute the playing trajectory.

In an example, this step can be executed as follows.

Firstly, a duration of each stage of the playing action can be determined according to the attributes of the played musical instrument and the playing duration corresponding to the current playing time. The attributes of the played musical instrument may include a duration ratio of each stage of the playing action, so that the duration of each stage can be determined according to the playing duration corresponding to the current playing time and the duration ratio of each stage. For example, in a case that the played musical instrument is the drum, a duration of a lifting stage and a duration of a beating stage can be determined according to the playing duration corresponding to the current playing time. In some embodiments of the present disclosure, if the duration ratio of the beating stage is denoted as s, the duration of the beating stage is equal to playing duration*s, and the duration of the lifting stage is equal to playing duration*(1−s).

Next, according to the current position of the end of the playing part corresponding to the played musical instrument, the position of the played musical instrument and the duration of each stage of the playing action, a playing trajectory of each stage of the playing action is generated, and the playing part corresponding to the played musical instrument is controlled to sequentially execute the playing trajectory of each stage.

It can be understood that, the playing duration corresponding to the current playing time will affect the generation of the trajectory. When the playing duration matches with a motion speed of the playing part, the planned trajectory and playing action are flexible and vivid. However, when the playing duration does not match with the motion speed of the playing part, the planned trajectory and playing action are mechanical and inflexible, and the degree of personification is low. Therefore, in another example, when this step is executed, it is possible to judge whether the playing duration matches with the motion speed of the playing part, and to make an adjustment when they do not match, i.e. executing this step as follows.

Firstly, according to an action time range of the playing part corresponding to the played musical instrument and the playing duration corresponding to the current playing time, an action duration and a waiting duration are determined.

For example, when the playing duration of the at least one played musical instrument corresponding to the current playing time is greater than an upper limit of the action time range of the playing part corresponding to the played musical instrument, the action duration is determined to be the upper limit, and the waiting duration is determined to be a difference between the playing duration of the at least one played musical instrument corresponding to the current playing time and the upper limit.

For another example, if the playing duration of the at least one played musical instrument corresponding to the current playing time is within the action time range of the playing part corresponding to the played musical instrument, the action duration is determined to be the playing duration of the at least one played musical instrument corresponding to the current playing time, and the waiting duration is determined to be zero.

For another example, if the playing duration of the at least one played musical instrument corresponding to the current playing time is less than a lower limit of the action time range of the playing part corresponding to the played musical instrument, the action duration is determined to be the lower limit and the waiting duration is determined to be zero.

Next, according to the current position of the end of the playing part corresponding to the played musical instrument, the position of the played musical instrument and the action duration, the playing trajectory of the playing action is generated, and the playing part corresponding to the played musical instrument is controlled to execute the playing trajectory within the action duration. That is, the playing action is executed only within the action duration, and a static state is kept within the waiting duration, so that the duration of executing the playing action (i.e. the action duration) matches with and adapts to the speed of the playing part. The waiting duration may be before the working duration (i.e. the action duration), after the working duration or within the working duration.

It can be understood that this step may be executed according to any one of the above two examples, or may be executed by combining the above two examples. For example, the action duration and the waiting duration are firstly determined, the duration of each stage is then determined according to the action duration, the trajectory of each stage is then generated according to the duration of each stage, the playing part is finally controlled to execute the trajectory of each stage, and the waiting duration is arranged between the respective stages. For example, in the scene where the robot plays the drum set, the waiting duration may be arranged between the lifting stage and the beating stage, that is, the trajectory of the lifting stage is executed first, the static state is then kept for the waiting duration, and the trajectory of the beating stage is then executed.

At step S503, for each playing time, a head trajectory of the playing action is generated according to a current position of the head, the head position at the current playing time and the playing duration corresponding to the current playing time, and the head is controlled to execute the head trajectory.

At step S502 and step S503, the trajectory may be generated by polynomial interpolation.

It can be understood that when step S502 and step S503 are executed, it may be judged whether a current time exceeds a total duration of the music file after the playing action of each playing time is completed. If the current time does not exceed the total duration of the music file, the playing action at the next playing time is continued to be executed. If the current time exceeds the total duration of the music file, the performance is completed, and the robot is controlled to restore to a static posture.

Figure 6:
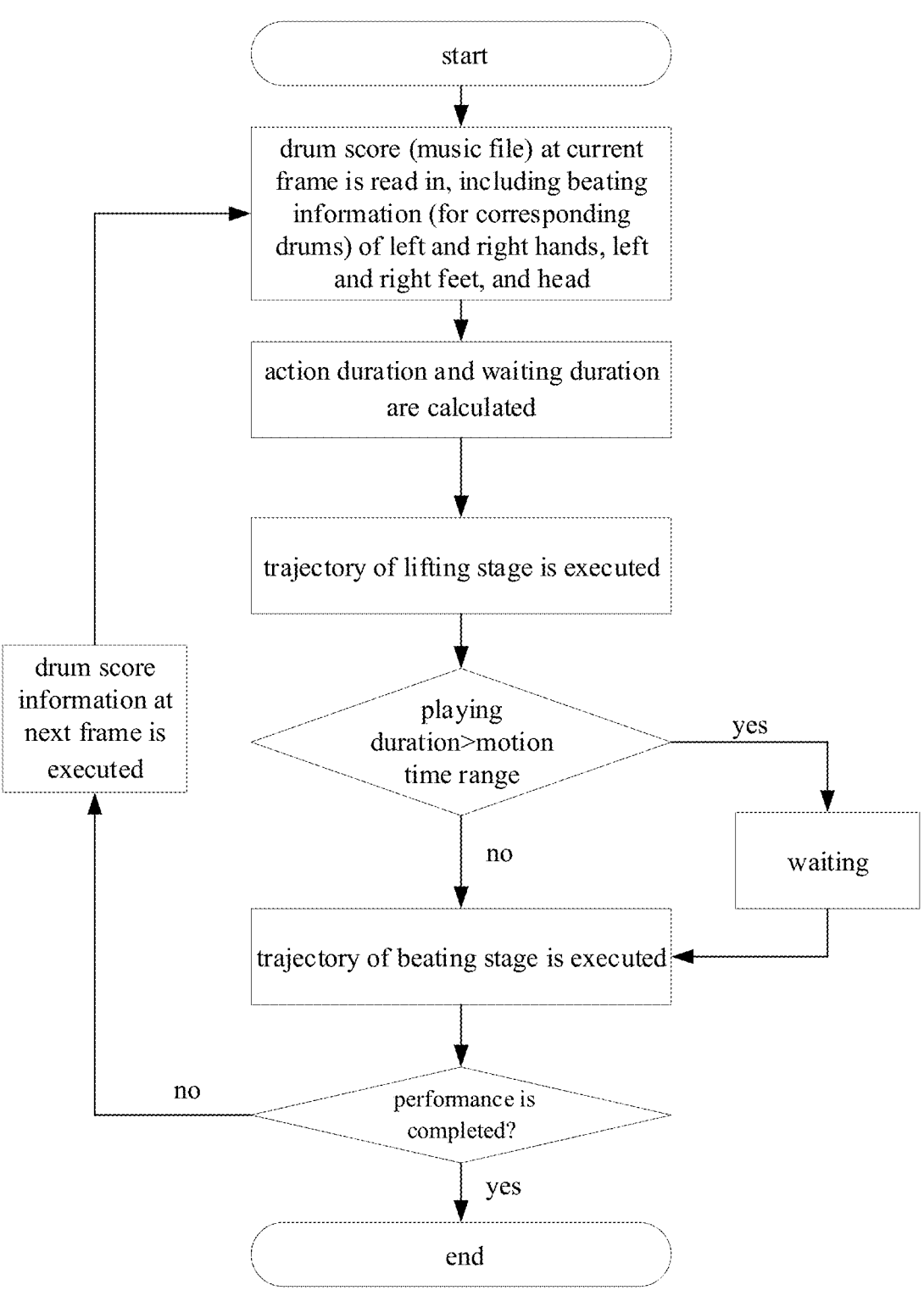
FIG. 6 is a flow chart of executing a playing action according to another embodiment of the present disclosure.

As shown in FIG. 6, which takes the scene where the robot plays the drum set as an example, a flow chart of controlling the playing part and the head to execute the playing action is shown, in which the specific details of each step involved therein have been described in detail in the embodiment shown in FIG. 5, and will not be repeated here.

According to the motion control method according to the embodiments of the present disclosure, the plurality of playing times and the at least one played musical instrument at each playing time can be obtained by obtaining the music file to be performed, then the head position at each playing time can be determined according to the at least one played musical instrument at each playing time, and finally, the playing part and the head of the robot can be controlled to execute the playing action according to the at least one played musical instrument and the head position at each playing time, so that the corresponding played musical instrument can generate the sound at each playing time, and the head can be in the corresponding head position. The playing time is the time when the sound of the musical instrument exists. Since the head position at each playing time is determined, the head of the robot also moves rhythmically while the robot is executing the playing action, which can not only increase the action diversity of the robot during the performance, but also improve the degree of personification, thus addressing the problems of insufficient dynamic characteristics and poor performance effect.

Moreover, the motion control method according to the embodiments of the present disclosure may be applied to the drum set performance of the humanoid robot, and has strong universality, so that there is no need to design a specialized robot or hardware for playing the drum sets. This method completes the cooperative control of the head, hands and feet of the humanoid robot, and has a better performance effect than the specialized robot or simple two arms with few degrees of freedom in the related art. This method automatically generates and executes the trajectories of the hands, feet and head, with a high degree of automation and intelligence.

Figure 7:
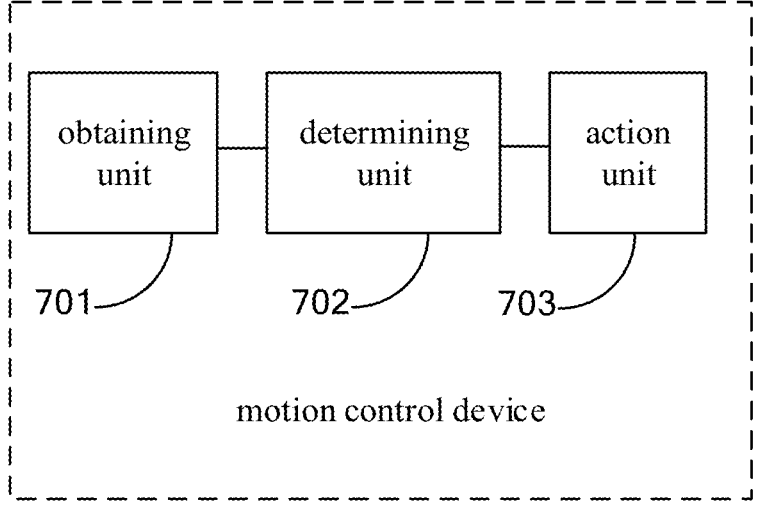
FIG. 7 is a block diagram of a motion control device according to an embodiment of the present disclosure.

According to another aspect of embodiments of the present disclosure, a motion control device is provided, which is applied to a robot. As shown in FIG. 7, the device includes: an obtaining unit 701 configured to obtain a music file to be performed, in which the music file includes a plurality of playing times and at least one played musical instrument at each playing time; a determining unit 702 configured to determine a head position at each playing time according to the at least one played musical instrument at each playing time; an action unit 703 configured to control a playing part and a head of the robot to execute a playing action according to the at least one played musical instrument and the head position at each playing time, to allow a corresponding played musical instrument to generate a sound and allow the head to be in a corresponding head position at each playing time.

In some embodiments of the present disclosure, the determining unit is further configured to: in a case that the at least one played musical instrument at any playing time is on a different side of the robot, the head position at a current playing time is determined on a side opposite to a side on which the head position at a previous playing time is; in a case that the at least one played musical instrument at any playing time is on the same side, the head position at the current playing time is determined according to a position of the at least one played musical instrument.

In some embodiments of the present disclosure, when determining the head position at the current playing time on the side opposite to the side on which the head position at the previous playing time is, the determining unit is further configured to determine any one of at least one preset position on the side opposite to the side on which the head position at the previous playing time is as the head position at the current playing time.

In some embodiments of the present disclosure, when determining the head position corresponding to the current playing time according to the position of the at least one played musical instrument, the determining unit is further configured to: determine a head position corresponding to one played musical instrument as the head position at the current playing time, when one played musical instrument exists at the current playing time; determine a midpoint position of head positions corresponding to a plurality of played musical instruments as the head position at the current playing time, when the plurality of played musical instruments exist at the current playing time.

In some embodiments of the present disclosure, the music file further includes the playing part corresponding to each of the at least one played musical instrument at each playing time; the device further includes an updating unit configured to: if any of the at least one played musical instrument at any playing time in the music file exceeds a movement range of the playing part corresponding to the played musical instrument, update the playing part corresponding to the played musical instrument to another playing part.

In some embodiments of the present disclosure, the action unit is further configured to: for each playing time, determine a time interval between a current playing time and the previous playing time as a playing duration corresponding to the current playing time; for each played musical instrument at each playing time, according to a current position of an end of the playing part corresponding to the played musical instrument, a position of the played musical instrument, and the playing duration corresponding to the current playing time, generate a playing trajectory of the playing action, and control the playing part corresponding to the played musical instrument to execute the playing trajectory; for each playing time, generate a head trajectory of the playing action according to a current position of the head, the head position at the current playing time and the playing duration corresponding to the current playing time, and control the head to execute the head trajectory.

In some embodiments of the present disclosure, when generating the playing trajectory of the playing action according to the current position of the end of the playing part corresponding to the played musical instrument, the position of the played musical instrument and the playing duration corresponding to the current playing time, and controlling the playing part corresponding to the played musical instrument to execute the playing trajectory, the action unit is further configured to: determine a duration of each stage of the playing action according to attributes of the played musical instrument and the playing duration corresponding to the current playing time; generate a playing trajectory of each stage of the playing action according to the current position of the end of the playing part corresponding to the played musical instrument, the position of the played musical instrument and the duration of each stage of the playing action, and control the playing part corresponding to the played musical instrument to sequentially execute the playing trajectory of each stage.

In some embodiments of the present disclosure, when determining the duration of each stage of the playing action according to the attributes of the played musical instrument and the playing duration corresponding to the current playing time, the action unit is further configured to determine a duration of a lifting stage and a duration of a beating stage according to the playing duration corresponding to the current playing time, when the played musical instrument is a drum.

In some embodiments of the present disclosure, when generating the playing trajectory of the playing action according to the current position of the end of the playing part corresponding to the played musical instrument, the position of the played musical instrument and the playing duration corresponding to the current playing time, and controlling the playing part corresponding to the played musical instrument to execute the playing trajectory, the action unit is further configured to: determine an action duration and a waiting duration according to an action time range of the playing part corresponding to the played musical instrument and the playing duration corresponding to the current playing time; generate the playing trajectory of the playing action according to the current position of the end of the playing part corresponding to the played musical instrument, the position of the played musical instrument and the action duration, and control the playing part corresponding to the played musical instrument to execute the playing trajectory within the action duration.

In some embodiments of the present disclosure, when determining the action duration and waiting duration according to the action time range of the playing part corresponding to the played musical instrument and the playing duration corresponding to the current playing time, the action unit is further configured to: when a playing duration of the at least one played musical instrument corresponding to the current playing time is greater than an upper limit of the action time range of the playing part corresponding to the played musical instrument, determine the action duration to be the upper limit, and determine the waiting duration to be a difference between the playing duration of the at least one played musical instrument corresponding to the current playing time and the upper limit; when the playing duration of the at least one played musical instrument corresponding to the current playing time is within the action time range of the playing part corresponding to the played musical instrument, determine the action duration to be the playing duration of the at least one played musical instrument corresponding to the current playing time, and determine the waiting duration to be zero; when the playing duration of the at least one played musical instrument corresponding to the current playing time is less than a lower limit of the action time range of the playing part corresponding to the played musical instrument, determine the action duration to be the lower limit and determine the waiting duration to be zero.

With regard to the device in the above embodiments, the specific manner in which each unit performs the operation has been described in detail in the embodiments of the method described above, and will not be described in detail here.

Figure 8:
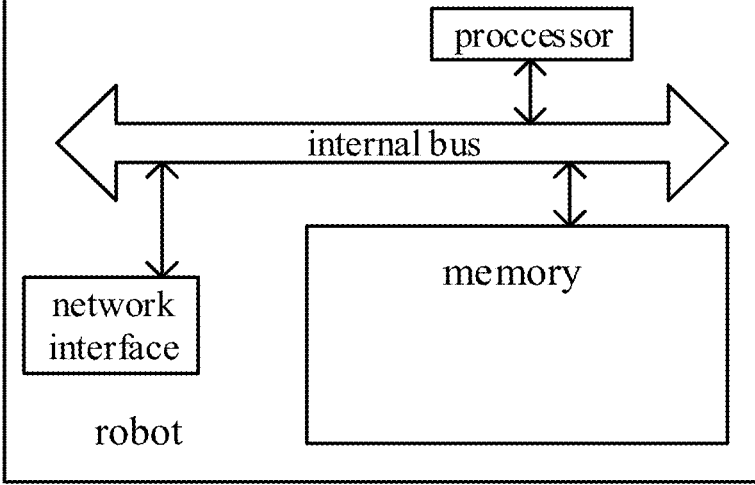
FIG. 8 is a block diagram of a robot according to an embodiment of the present disclosure.

In another aspect, at least one embodiment of the present disclosure provides a robot. As shown in FIG. 8, which shows a structure of the robot, the robot includes a memory and a processor, the memory is used for storing computer instructions that can be run on the processor, and the processor is used for controlling motion based on any method of the first aspect when executing the computer instructions.

In another aspect, at least one embodiment of the present disclosure provides a computer-readable storage medium on which a computer program is stored, and the computer program implements any method described above, when executed by a processor.

Other embodiments of the present disclosure will easily occur to those skilled in the art after they consider the specification and practice the content disclosed herein. The present disclosure is intended to cover any variation, usage or adaptation of the present disclosure, which follow the general principle of the present disclosure and include the common sense or conventional technical means in the related art that is not disclosed in the present disclosure. The specification and embodiments should be regarded as illustrative only, while the true scope and spirit of the present disclosure are indicated by the following claims.

It should be understood that the present disclosure is not limited to the precise structures described above and illustrated in the accompanying drawings and that various modifications and changes may be made without departing from the scope thereof. The scope of the present disclosure is limited only by the appended claims.

What is claimed is:

1. A motion control method, comprising:

obtaining, by a robot, a music file to be performed, wherein the music file comprises a plurality of playing times and at least one played musical instrument at each playing time;

determining, by the robot, a head position at each playing time according to the at least one played musical instrument at each playing time; and controlling, by the robot, a playing part and a head of the robot to execute a playing action, according to the at least one played musical instrument and the head position at each playing time, to allow a corresponding played musical instrument to generate a sound and allow the head to be in a corresponding head position at each playing time, wherein controlling the playing part and the head of the robot to execute the playing action comprises:

for each playing time, determining a time interval between a current playing time and a previous playing time as a playing duration corresponding to the current playing time;

for each played musical instrument at each playing time, according to a current position of an end of the playing part corresponding to the played musical instrument, a position of the played musical instrument, and the playing duration corresponding to the current playing time, generating a playing trajectory of the playing action, and controlling the playing part corresponding to the played musical instrument to execute the playing trajectory; and for each playing time, generating a head trajectory of the playing action according to a current position of the head, the head position at the current playing time and the playing duration corresponding to the current playing time, and controlling the head to execute the head trajectory.

2. The motion control method according to claim 1, wherein each played musical instrument is marked with a first orientation or a second orientation, and the first orientation and the second orientation are opposite orientations; and wherein determining the head position at each playing time according to the at least one played musical instrument at each playing time comprises:

determining the head position at a current playing time on a second side of an original position of the head in response to determining that the at least one played musical instrument at any playing time is marked with a different orientation and the head position at a previous playing time is on a first side of the original position of the head.

3. The motion control method according to claim 2, wherein determining the head position at the current playing time on the second side of the original position of the head comprises:

determining any one of at least one preset position on the second side of the original position of the head as the head position at the current playing time.

4. The motion control method according to claim 1, wherein each played musical instrument is marked with a first orientation or a second orientation, and the first orientation and the second orientation are opposite orientations; and wherein determining the head position at each playing time according to the at least one played musical instrument at each playing time comprises:

determining the head position at a current playing time according to a position of the at least one played musical instrument in response to determining that the at least one played musical instrument at any playing time is marked with the same orientation.

5. The motion control method according to claim 4, wherein determining the head position corresponding to the current playing time according to the position of the at least one played musical instrument comprises:

in response to determining that one played musical instrument exists at the current playing time, determining a head position corresponding to the played musical instrument as the head position at the current playing time; and in response to determining that a plurality of played musical instruments exist at the current playing time, determining a midpoint position of head positions corresponding to the plurality of played musical instruments as the head position at the current playing time.

6. The motion control method according to claim 1, wherein the music file further comprises the playing part corresponding to each of the at least one played musical instrument at each playing time; and wherein the method further comprises:

in response to determining that any of the at least one played musical instrument at any playing time of the music file exceeds a movement range of the playing part corresponding to the played musical instrument, updating the playing part corresponding to the played musical instrument to another playing part.

7. The motion control method according to claim 1, wherein generating the playing trajectory of the playing action according to the current position of the end of the playing part corresponding to the played musical instrument, the position of the played musical instrument, and the playing duration corresponding to the current playing time, and controlling the playing part corresponding to the played musical instrument to execute the playing trajectory, comprises:

determining a duration of each stage of the playing action according to attributes of the played musical instrument and the playing duration corresponding to the current playing time; and according to the current position of the end of the playing part corresponding to the played musical instrument, the position of the played musical instrument and the duration of each stage of the playing action, generating a playing trajectory of each stage of the playing action, and controlling the playing part corresponding to the played musical instrument to sequentially execute the playing trajectory of each stage.

8. The motion control method according to claim 7, wherein determining the duration of each stage of the playing action according to the attributes of the played musical instrument and the playing duration corresponding to the current playing time comprises:

determining a duration of a lifting stage and a duration of a beating stage according to the playing duration corresponding to the current playing time in response to determining that the played musical instrument is a drum.

9. The motion control method according to claim 1, wherein generating the playing trajectory of the playing action according to the current position of the end of the playing part corresponding to the played musical instrument, the position of the played musical instrument, and the playing duration corresponding to the current playing time, and controlling the playing part corresponding to the played musical instrument to execute the playing trajectory, comprises:

determining an action duration and a waiting duration according to an action time range of the playing part corresponding to the played musical instrument and the playing duration corresponding to the current playing time; and according to the current position of the end of the playing part corresponding to the played musical instrument, the position of the played musical instrument and the action duration, generating the playing trajectory of the playing action, and controlling the playing part corresponding to the played musical instrument to execute the playing trajectory within the action duration.

10. The motion control method according to claim 9, wherein determining the action duration and the waiting duration according to the action time range of the playing part corresponding to the played musical instrument and the playing duration corresponding to the current playing time comprises:

in response to determining that a playing duration of the at least one played musical instrument corresponding to the current playing time is greater than an upper limit of the action time range of the playing part corresponding to the played musical instrument, determining the action duration to be the upper limit, and determining the waiting duration to be a difference between the playing duration of the at least one played musical instrument corresponding to the current playing time and the upper limit.

11. The motion control method according to claim 9, wherein determining the action duration and the waiting duration according to the action time range of the playing part corresponding to the played musical instrument and the playing duration corresponding to the current playing time comprises:

in response to determining that a playing duration of the at least one played musical instrument corresponding to the current playing time is within the action time range of the playing part corresponding to the played musical instrument, determining the action duration to be the playing duration of the at least one played musical instrument corresponding to the current playing time, and determining the waiting duration to be zero.

12. The motion control method according to claim 9, wherein determining the action duration and the waiting duration according to the action time range of the playing part corresponding to the played musical instrument and the playing duration corresponding to the current playing time comprises:

in response to determining that a playing duration of the at least one played musical instrument corresponding to the current playing time is less than a lower limit of the action time range of the playing part corresponding to the played musical instrument, determining the action duration to be the lower limit and determining the waiting duration to be zero.

13. A robot, comprising a memory and a processor, wherein the memory is configured for storing computer instructions capable of being run on the processor, and when executing the computer instructions, the processor is configured for:

obtaining a music file to be performed, wherein the music file comprises a plurality of playing times and at least one played musical instrument at each playing time;

determining a head position at each playing time according to the at least one played musical instrument at each playing time; and controlling a playing part and a head of the robot to execute a playing action, according to the at least one played musical instrument and the head position at each playing time, to allow a corresponding played musical instrument to generate a sound and allow the head to be in a corresponding head position at each playing time, wherein the processor is further configured to:

for each playing time, determine a time interval between a current playing time and a previous playing time as a playing duration corresponding to the current playing time;

for each played musical instrument at each playing time, according to a current position of an end of the playing part corresponding to the played musical instrument, a position of the played musical instrument, and the playing duration corresponding to the current playing time, generate a playing trajectory of the playing action, and control the playing part corresponding to the played musical instrument to execute the playing trajectory; and for each playing time, generate a head trajectory of the playing action according to a current position of the head, the head position at the current playing time and the playing duration corresponding to the current playing time, and control the head to execute the head trajectory.

14. The robot according to claim 13, wherein each played musical instrument is marked with a first orientation or a second orientation, and the first orientation and the second orientation are opposite orientations; and wherein the processor is further configured for:

determining the head position at a current playing time on a second side of an original position of the head in response to determining that the at least one played musical instrument at any playing time is marked with a different orientation and the head position at a previous playing time is on a first side of the original position of the head.

15. The robot according to claim 14, wherein the processor is further configured for:

determining any one of at least one preset position on the second side of the original position of the head as the head position at the current playing time.

16. The robot according to claim 13, wherein each played musical instrument is marked with a first orientation or a second orientation, and the first orientation and the second orientation are opposite orientations; and wherein the processor is further configured for:

determining the head position at a current playing time according to a position of the at least one played musical instrument in response to determining that the at least one played musical instrument at any playing time is marked with the same orientation.

17. The robot according to claim 16, wherein the processor is further configured for:

in response to determining that one played musical instrument exists at the current playing time, determining a head position corresponding to the played musical instrument as the head position at the current playing time; and in response to determining that a plurality of played musical instruments exist at the current playing time, determining a midpoint position of head positions corresponding to the plurality of played musical instruments as the head position at the current playing time.

18. The robot according to claim 13, wherein the music file further comprises the playing part corresponding to each of the at least one played musical instrument at each playing time; and wherein the processor is further configured for:

in response to determining that any of the at least one played musical instrument at any playing time of the music file exceeds a movement range of the playing part corresponding to the played musical instrument, updating the playing part corresponding to the played musical instrument to another playing part.

* * * * *